United States Patent
Tayeh et al.

(10) Patent No.: US 9,594,403 B2
(45) Date of Patent: Mar. 14, 2017

(54) EMBEDDING BIOMETRIC DATA FROM A WEARABLE COMPUTING DEVICE IN METADATA OF A RECORDED IMAGE

(71) Applicant: Sony Corporation, Tokyo (JP)

(72) Inventors: Ahmed Tayeh, Lund (SE); Nabaz Barzangi, Lund (SE); Mostafa Attariani, Malmö (SE); Mathias Jensen, Malmö (SE); Rodrigo Terra Rios, Malmö (SE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/647,350

(22) PCT Filed: May 5, 2014

(86) PCT No.: PCT/IB2014/061219
§ 371 (c)(1),
(2) Date: May 26, 2015

(87) PCT Pub. No.: WO2015/170138
PCT Pub. Date: Nov. 12, 2015

(65) Prior Publication Data
US 2016/0048722 A1    Feb. 18, 2016

(51) Int. Cl.
*G06F 1/16* (2006.01)
*G06K 9/00* (2006.01)
*G06T 7/00* (2006.01)
*G06F 17/30* (2006.01)
*H04M 1/725* (2006.01)

(52) U.S. Cl.
CPC ........ *G06F 1/163* (2013.01); *G06F 17/30244* (2013.01); *G06K 9/00302* (2013.01); *G06K 9/00885* (2013.01); *G06T 7/0081* (2013.01); *G06K 2009/00328* (2013.01); *G06T 2207/30201* (2013.01); *H04M 1/7253* (2013.01); *H04M 2250/52* (2013.01)

(58) Field of Classification Search
None
See application file for complete search history.

(56) References Cited

U.S. PATENT DOCUMENTS

| | | | |
|---|---|---|---|
| 2010/0033303 A1* | 2/2010 | Dugan | A61B 5/0002 340/5.82 |
| 2010/0325218 A1* | 12/2010 | Castro | G06Q 50/01 709/206 |
| 2011/0124977 A1 | 5/2011 | Winarski | |

(Continued)

FOREIGN PATENT DOCUMENTS

| | | | |
|---|---|---|---|
| JP | 2009130384 A | 6/2009 | |
| WO | 2012171033 A1 | 12/2012 | |
| WO | WO 2012171033 A1 * | 12/2012 | ........... A61B 5/6831 |

*Primary Examiner* — Bhavesh Mehta
*Assistant Examiner* — Narek Zohrabyan
(74) *Attorney, Agent, or Firm* — Coats and Bennett, PLLC

(57) ABSTRACT

According to an example method implemented by an imaging device, an image is recorded of a subject to which a wearable computing device is secured. Responsive to the recording, the imaging device wirelessly receives data from the wearable computing device. The data includes an identifier of the wearable computing device and biometric data of the subject. The identifier and biometric data are embedded as metadata in the recorded image.

16 Claims, 8 Drawing Sheets

(56) References Cited

U.S. PATENT DOCUMENTS

| | | | |
|---|---|---|---|
| 2012/0321143 A1 | 12/2012 | Krupka et al. | |
| 2013/0036363 A1* | 2/2013 | Johnson | G06F 21/6245 715/738 |
| 2014/0089672 A1 | 3/2014 | Luna et al. | |
| 2015/0085146 A1* | 3/2015 | Khemkar | H04N 7/147 348/207.1 |
| 2015/0169832 A1* | 6/2015 | Davis | A61B 5/165 702/19 |
| 2015/0178915 A1* | 6/2015 | Chatterjee | G06K 9/20 382/128 |

* cited by examiner

EMBEDDING BIOMETRIC DATA FROM A WEARABLE COMPUTING DEVICE IN METADATA OF A RECORDED IMAGE

TECHNICAL FIELD

The present disclosure relates to biometric data, and more particularly to embedding biometric data in metadata of a recorded image.

BACKGROUND

Wearable computing devices are becoming increasingly popular, and in some cases are being used as companion devices for smartphones. In particular, some wearable computing devices are being used for various health monitoring applications. Such "life logger" devices include accelerometers that sense user movements, which serve as the basis for various fitness calculations (e.g., distance walked, quantity of calories burned, quantity of floors climbed, activity duration and intensity, etc.). Such calculations can be accumulated over a time period and then transmitted to a computing device (e.g., a smartphone or desktop computer) for long term storage. However, such data has only been used for fitness purposes.

SUMMARY

According to one aspect of the present disclosure, a method is implemented by an imaging device. The imaging device records an image of a subject to which a wearable computing device is secured. Responsive to the recording, data is wirelessly received from the wearable computing device, with the data including an identifier of the wearable computing device and biometric data of the subject. The identifier and the biometric data are embedded as metadata in the recorded image.

The biometric data could include an address of a biometric data server from which biometric data of the subject can be retrieved based on the device identifier, one or more sensor readings recorded by the wearable computing device, or one or more mood indicators derived from sensor readings recorded by the wearable computing device, for example.

In some embodiments, a position of the subject within the image is determined (e.g., using a facial recognition algorithm), and the determined position is also embedded as metadata in the recorded image.

According to another aspect of the present disclosure, a method is implemented by a media server. The media server obtains an image of a subject, and determines a timestamp and device identifier from metadata embedded in the image. A request is sent to a biometric data server to obtain biometric data, with the request including the timestamp and the device identifier. Responsive to the sending, biometric data is received that comprises a mood indication for the subject as depicted in the image. The image and mood indication are linked to a user account associated with the device identifier.

In some embodiments, a location of the subject is included in the metadata embedded in the image, and the location is also linked to the user account.

In some embodiments, the media server is further configured to receive a user request for images of the subject in which the subject is depicted in a specified mood, determine a collection of images of the subject in which the subject is depicted in the specified mood, and transmit an indication of the collection of images as a response to the user request.

According to another aspect of the present disclosure, an imaging device includes a camera, and one or more processing circuits that are configured to use the camera to record an image of a subject to which a wearable computing device is secured. The one or more processing circuits are further configured to, responsive to the recording, wirelessly receive data from the wearable computing device. The data includes an identifier of the wearable computing device and biometric data of the subject. The one or more processing circuits are further configured to embed the identifier and the biometric data as metadata in the recorded image.

The biometric data could include an address of a biometric data server from which biometric data of the subject can be retrieved based on the device identifier, one or more sensor readings recorded by the wearable computing device, or one or more mood indicators derived from sensor readings recorded by the wearable computing device, for example.

In some embodiments, the one or more processing circuits of the imaging device are further configured to determine a position of the subject within the image (e.g., using a facial recognition algorithm), and embed the determined position as metadata in the recorded image.

According to another aspect of the present disclosure, a media server includes a transceiver circuit, and also includes one or more processing circuits configured to obtain an image of a subject via the transceiver circuit. The one or more processing circuits are further configured to determine a timestamp and device identifier from metadata embedded in the image, and send a request to a biometric data server to obtain biometric data. The request includes the timestamp and the device identifier. The one or more processing circuits are further configured to, responsive to the sending, receive biometric data that comprises a mood indication for the subject, and link the image and mood indication to a user account associated with the device identifier.

In some embodiments, a location of the subject is included in the metadata embedded in the image, and the location is also linked to the user account.

In some embodiments, the one or more processing circuits of the media server are further configured to: receive a user request for images of the subject in which the subject is depicted in a specified mood, determine a collection of images of the subject in which the subject is depicted in the specified mood, and transmit an indication of the collection of images as a response to the user request.

DETAILED DESCRIPTION

The present disclosure describes methods and related apparatuses for embedding biometric data of a subject depicted in a recorded image in metadata of the image, and subsequently linking the same or related biometric data to a user account of the subject (e.g., a social media account). The biometric data is based on sensor measurements from a wearable computing device worn by the subject in the image. Such measurements could include body temperature, heart rate, blood pressure, etc. In one or more embodiments, the biometric data that is linked to the user account is a mood indication derived from the measurements of the wearable computing device. Such techniques could be used to enable a subject of a photograph to lookup biometric data on themselves when viewing the photograph at a later date (e.g., through a social media website) and/or to lookup photographs in which they are depicted in a specified mood.

Figure 1:
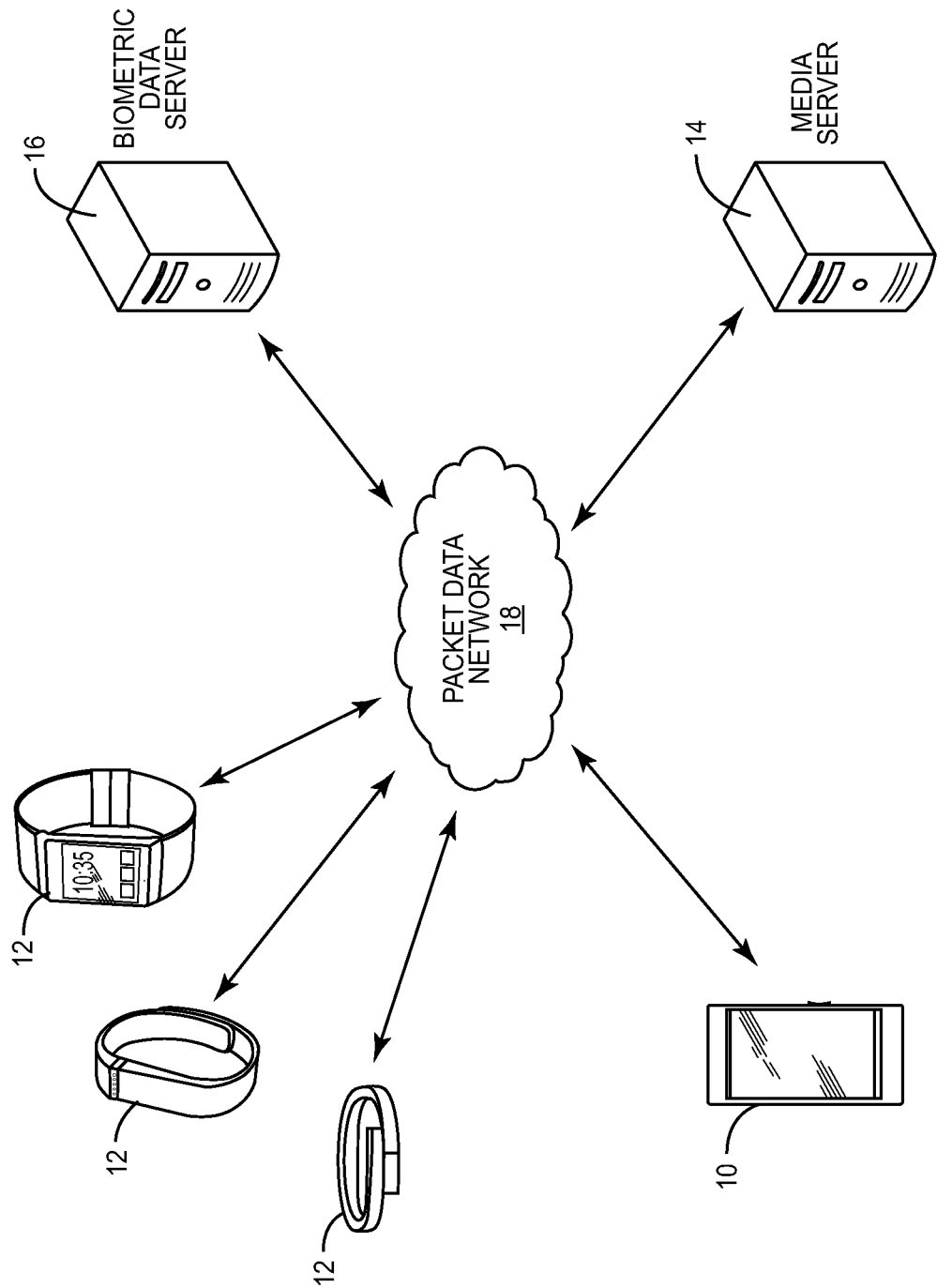
FIG. 1 illustrates an example system for utilizing biometric data from wearable computing devices in connection with images recorded by an imaging device of subjects to which those wearable computing devices are secured.

FIG. 1 illustrates an example system for utilizing biometric data from one or more wearable computing devices 12 in connection with images recorded by an imaging device 10 of subjects to which those wearable computing devices are secured. The system includes an imaging device 10, one or more wearable computing devices 12, a media server 14, and a biometric data server 16 that communicate via a packet data network 18 (e.g., the Internet). In some embodiments, data from the wearable computing devices 12 is transmitted over the packet data network 18 via an intermediate device (e.g., a smartphone to which a wearable computing device 12 is paired, or a laptop to which the wearable computing device 12 is connected for data synching). In a similar fashion, the imaging device 12 may also use an intermediate device (e.g., a laptop or desktop computer) to upload images through the packet data network 18 (e.g., if the imaging device 10 is a digital camera).

Each wearable computing device 12 is configured to record biometric data of the subject wearing the device 12 (e.g., body temperature, heart rate, blood pressure, etc.). The imaging device 10 can include any variety of imaging devices that include a camera (e.g., a smartphone, tablet, digital camera, video camera, laptop, etc.). Media server 14 stores images recorded by the imaging device 10, and biometric data server 16 stores biometric data recorded by the wearable computing devices 12. By using appropriate timestamps and device identifiers, the biometric data of the wearable computing devices 12 can be linked to images in which subjects wearing the devices 12 are depicted.

Figure 2:
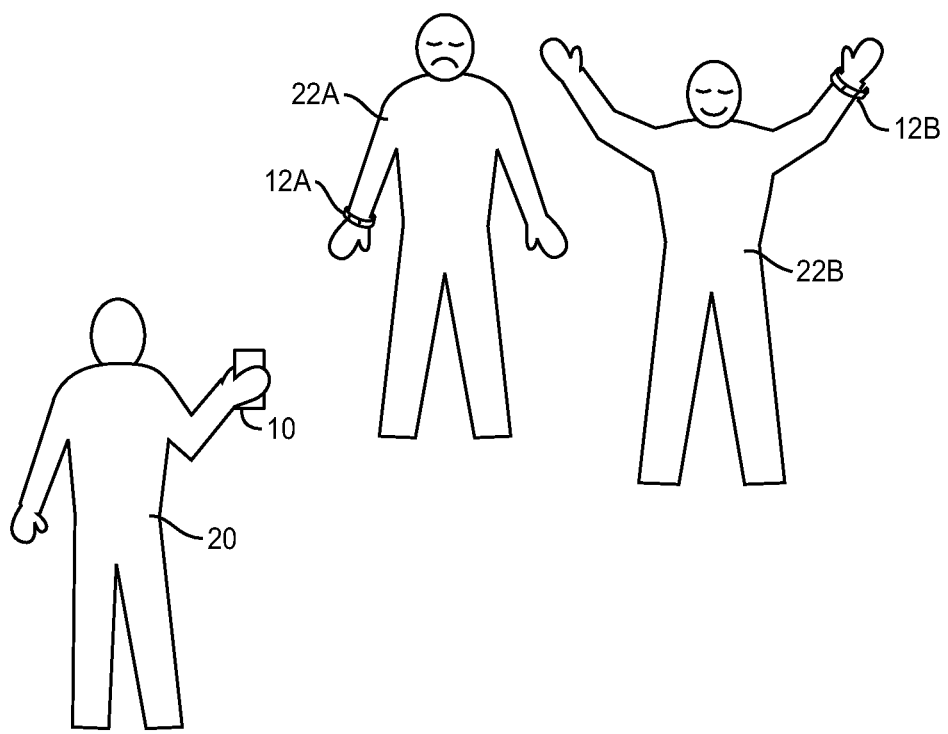
FIG. 2 illustrates an example scene that includes two subjects, each wearing a wearable computing device.
Figure 3:
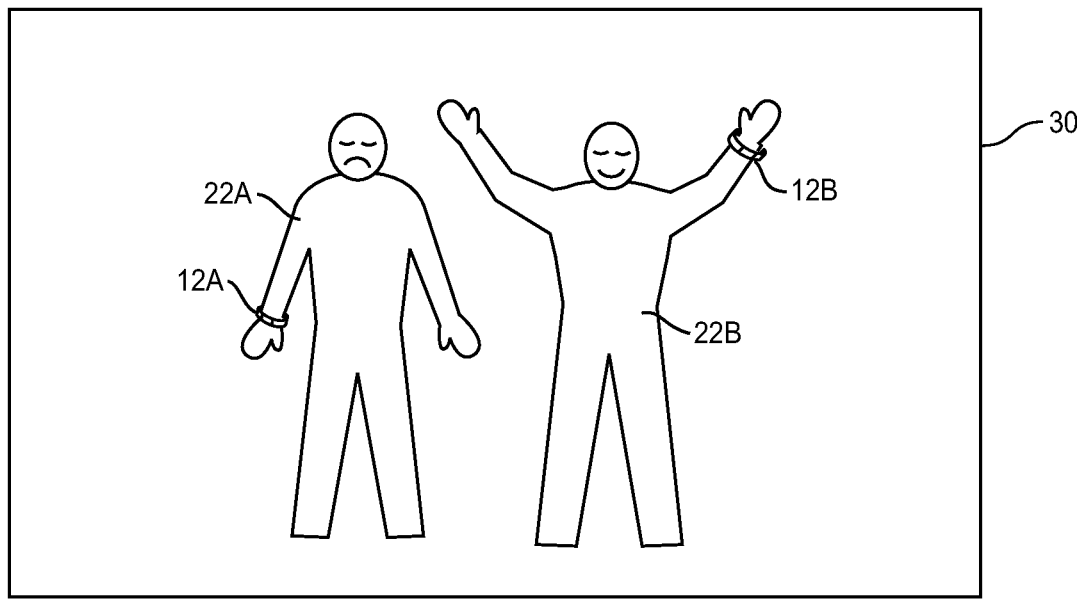
FIG. 3 illustrates a recorded image that depicts the scene of FIG. 2.

FIG. 2 illustrates a depiction of a scene in which a person 20 is using an imaging device 10 to record a photograph of subjects 22A and 22B. Each of the subjects 22A, 22B is wearing a respective wearable computing device 12A, 12B. The imaging device 10 is configured to wirelessly communicate with the wearable computing devices 12A-B to obtain biometric data for the subjects 22A-B. FIG. 3 illustrates a recorded image 30 of the scene of FIG. 1 in which the subjects 22A, 22B are depicted. The facial expressions of the subjects 22A-B suggest that subject 22A is unhappy and that subject 22B is happy. As discussed below, biometric data from the wearable computing devices 12A-B can be used to reliably determine the mood of the subjects 22A-B.

Figure 4:
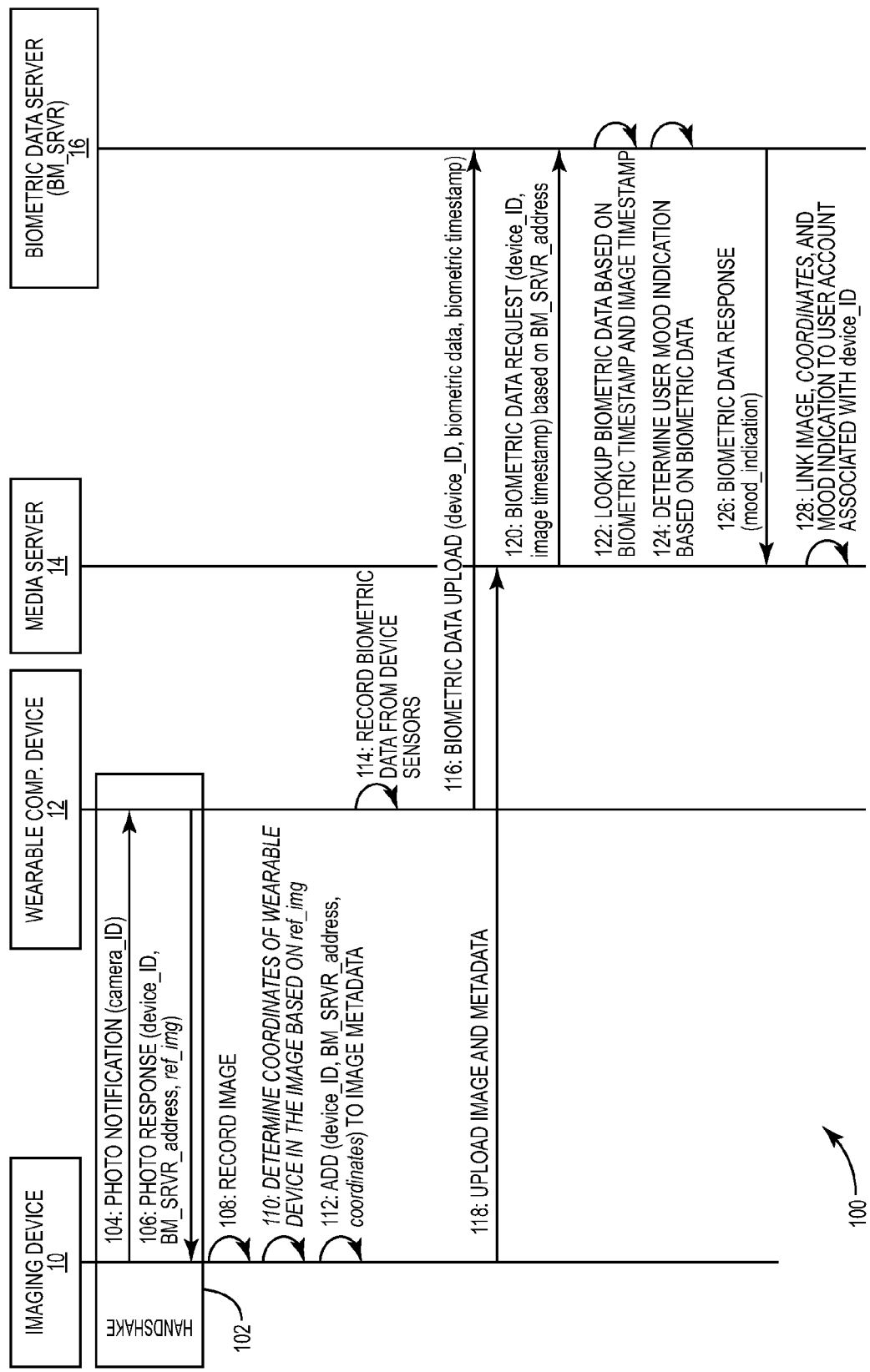
FIG. 4 is an example diagram of signaling performed by various devices in connection with embedding biometric data of one or both of the subjects in the recorded image.

FIG. 4 illustrates an example diagram 100 of signaling performed by camera 10, wearable computing device 12, media server 14, and biometric data server 16 in connection with embedding biometric data of one or both of the subjects 22 in the image 30. For the discussion below, a simplified example including a single subject 22 and wearable computing device 12 will be discussed. A handshake occurs between an imaging device 10 and a wearable computing device 12 (102). As part of the handshake 102, a photo notification is transmitted from the imaging device 10 to the wearable computing device 12, with the notification including an identifier of the imaging device ("camera_ID") (104). A photo response 106 is received based on the notification of 104, which includes an identifier of the wearable computing device 12 ("device_ID"), an address of a biometric data server 16 ("BM_SRVR_address"), and a reference image depicting a face of the subject 22 wearing the wearable computing device 12 ("ref_img").

An image of one of the subjects 22 is recorded (108). The imaging device 10 performs a facial recognition algorithm to determine coordinates of the subject 22 within the image (110). The device_ID, BM_SRVR_address, and determined coordinates of the subject are added to the metadata of the recorded image (112). In one or more embodiments, these items are embedded along with existing metadata of the image (e.g., an image timestamp, shutter speed, aperture, lens focal length, etc.).

The wearable computing device 12 records biometric data of the subject 22 from one or more device sensors (114), and uploads the biometric data to the biometric data server 16 along with the device_ID and a biometric timestamp indicative of when the biometric data was recorded (116). The imaging device 10 uploads the image and its embedded metadata (which includes the items from 112 and an image timestamp) to a media server 14 (118).

The media server 14 transmits a biometric data request to the biometric data server 16 based on the BM_SRVR_address (120). In one or more embodiments the BM_SRVR_address is an Internet Protocol (IP) address of the biometric data server 16. The request includes the device_ID, and a timestamp of when the image was recorded. The biometric data server 16 receives the request, and in response looks up biometric data uploaded from the wearable computing device 12 based on a comparison of the biometric timestamp and image timestamp (122). In one or more embodiments, this involves matching the timestamps within a timestamp threshold (e.g., on the order of a number of seconds) to ensure that the biometric data being retrieved actually corresponds to the image in question.

The biometric data server 16 determines a user mood indication based on the biometric data (124), and transmits a biometric data response including the mood indication to the media server 14 (126). The media server 14 links the image, the coordinates of the subject, and the mood indication to a user account associated with the device_ID.

Performance of the signaling in the diagram 100 could be used to enable the subject 22 to lookup biometric data of themselves (e.g., in the form of the mood indication) at a later date when viewing the image from the media server 14 (128). In the same or another embodiment, performance of the signaling shown in diagram 100 could be used to enable a user to search for images of themselves based on their mood (e.g., provide all images where I was determined to be in a happy mood). For example, if the media server 14 was part of a social media platform, the stored images along with mood data could be provided within a social media application and/or website.

The signaling of the diagram 100 could be concurrently performed for multiple subjects 22A-B such that the metadata of the recorded image 30 includes a device ID for each device 12A-B, coordinates of each subject 22A-B, and possibly even multiple biometric data server addresses (e.g., one per device 12). Subsequently, the coordinates and biometric data for each respective subject 22A-B could be linked to a respective user account for that subject (e.g., a social media account).

The determining of the user mood indication could be based on a plurality of mood rules and/or a mapping of various moods to various items of biometric data. For example, various moods could be mapped to various combinations of biometric data, and/or various biometric data ranges. Some example moods could include happy, sad, excited, relaxed, anxious, stressed, content, etc. There may also be overlaps of mood. For example, a subject could be happy and excited at the same time, or could be happy and relaxed at the same time.

In one or more embodiments, the photo notification 104 is performed responsive to the imaging device 10 focusing on the subjects in question (e.g., through an auto-focus feature of the imaging device 10).

Items shown in italics in FIG. 4 are optional, and may be excluded in some embodiments. Thus, in one or more embodiments the positioning determination 110 may be omitted, and inclusion of the reference image in 106 and of the coordinates in the linking of 128 may also be omitted.

In some embodiments, the imaging device 10 provides a feature for accepting or rejecting photo responses received from wearable computing devices 12. This could be useful if the positioning determination features discussed above are omitted, or if positioning is supported but a reference image received from a wearable computing device 12 is not recognized (e.g., if the subject wearing the device 12 is facing away from the imaging device 10). This could also be useful if a photo response is received from an individual in the background of a photograph who is a stranger and whose biometric data is not desired. According to such a feature, a user interface of the imaging device 10 could ask for prompt an operator of the imaging device 10 for confirmation before a photo response from one or more wearable computing devices 12 is accepted (e.g., before biometric data from such a response is included in the embedded metadata).

In FIG. 4, and other figures herein, it is possible that actions shown as being performed sequentially may be performed concurrently or in different orders. For example, in one or more embodiments the uploading of the image and metadata (118) of FIG. 4 could occur concurrently with, or even before the biometric data upload (116) of FIG. 4. As another example, the determination of a mood indication based on biometric data (124) could be performed before the biometric data request (120) is received. Thus, unless otherwise indicated, it is understood that the various actions depicted herein could be performed in other orders.

Figure 5:
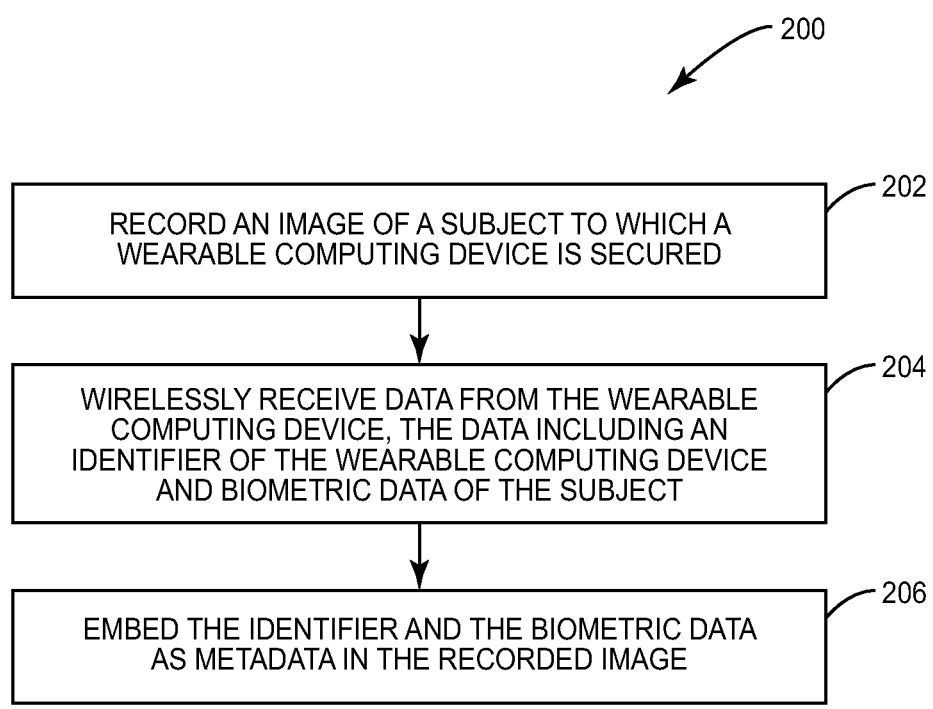
FIG. 5 illustrates example processing operations performed by an imaging device of the system of FIG. 1 according to one embodiment.

FIG. 5 illustrates example processing operations 200 performed by the imaging device 10 according to one embodiment. The imaging device 10 records an image of a subject 22 to which a wearable computing device 12 is secured (block 202). Responsive to the recording, the imaging device 10 wirelessly receives data from the wearable computing device 12 (block 204), with the data including an identifier of the wearable computing device 12 and biometric data of the subject 22 (e.g., the "BM_SRVR_address"). The imaging device embeds the identifier and the biometric data as metadata in the recorded image 30 (block 206).

In one or more embodiments the recording of block 202 comprises transmitting a request for biometric data to the wearable computing device (see, e.g., the request 104 of FIG. 3). Optionally, the imaging device 10 may also estimate a position of the subject within the image 30, and embed an indication of the position as metadata in the recorded image. The position estimation can be performed by receiving a reference image of the face of the subject 22 ("ref_img") from the wearable computing device 12, and performing a facial recognition algorithm to determine the position of the subject within the recorded image based on the reference image.

Figure 6:
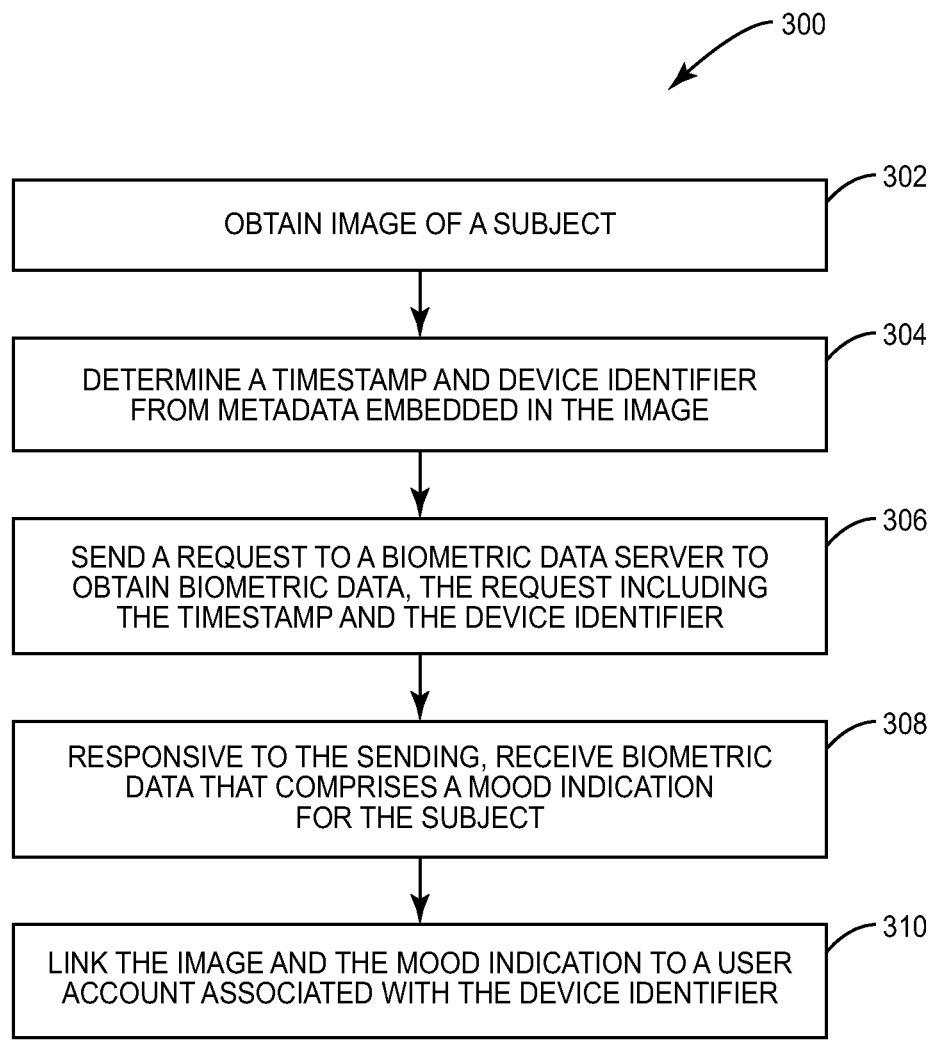
FIG. 6 illustrates example processing operations performed by a media server of the system of FIG. 1 according to one embodiment.

FIG. 6 illustrates example processing operations 300 performed by the media server 14 according to one embodiment. The media server 14 obtaining an image 30 of a subject 22A (block 302), determines a timestamp and device identifier (device_ID) from metadata embedded in the image 30 (block 304), and sends a request to a biometric data server 16 to obtain biometric data (block 306). The request of block 306 includes the timestamp and the device identifier. Responsive to the sending, the media server 14 receives biometric data that comprises a mood indication for the subject (block 308), and links the image and the mood indication to a user account associated with the device identifier (block 310). This could be a social media account, for example.

In one or more embodiments, the media server 14 is further configured to determine a location of the subject within the image 30 from additional metadata embedded in the image 30. In such embodiments, linking the image 30 and the mood indication to a user account associated with the device identifier also includes linking the location of the subject within the image 30 to the user account.

In one or more embodiments, the media server 14 may include search and/or filtering features based on the mood indication. For example, in one embodiment the media server 14 receives a user request for images of the subject in which the subject is depicted in a specified mood (e.g., "provide pictures where I am 'happy'"), and based on the user request the media server 14 determines a collection of images of the subject in which the subject is depicted in the specified mood. An indication of the collection of images is then sent as a response to the user request.

In the example diagram 100 of FIG. 4, the biometric data returned by the wearable computing device 12 includes an address of the biometric data server 16 ("BM_SRVR_address") from which biometric data of the subject 22 can be retrieved based on the device identifier ("device_ID"). In other embodiments (such as those of FIG. 7), the biometric data includes sensor readings recorded by the wearable computing device 12 and/or one or more mood indicators derived from such sensor readings recorded by the wearable computing device 12.

Figure 7:
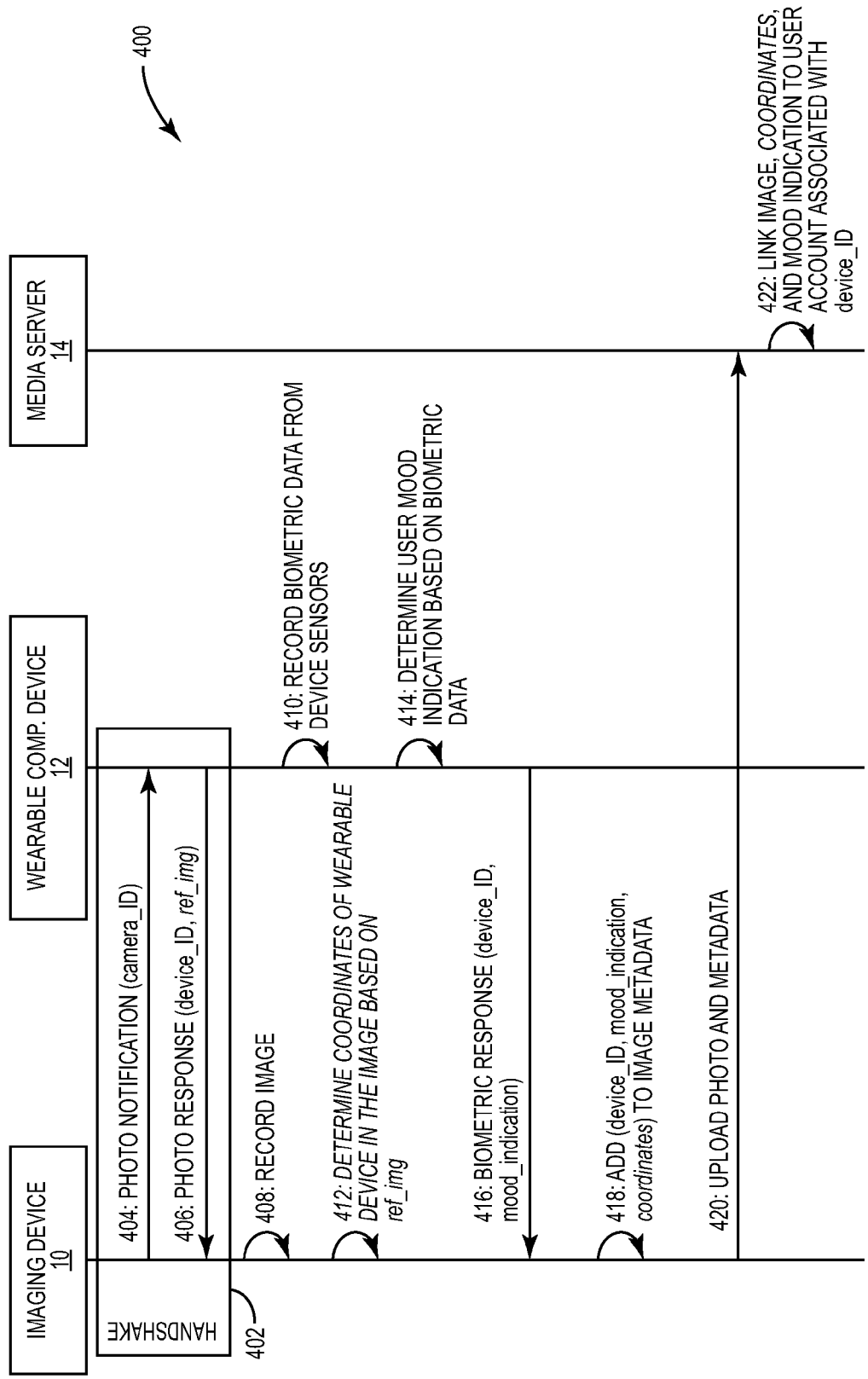
FIG. 7 is another example diagram of signaling performed by various devices in connection with embedding biometric data of one or both of the subjects in the recorded image.

Referring now to FIG. 7, a diagram 400 of signaling performed by camera 10, wearable computing device 12, and media server 14 is shown, in which biometric data server 16 is omitted. For the discussion below, a simplified example including a single subject 22 and wearable computing device 12 will be discussed. A handshake occurs between imaging device 10 and wearable computing device 12 (402). As part of the handshake 402, a photo notification is transmitted from the camera 10 to the wearable computing device 12, with the notification including an identifier of the imaging device ("camera_ID") (404). A photo response 406 is received based on the notification of 404, that includes an identifier of the wearable computing device 12 ("device_ID"), and a reference image depicting a face of the subject 22 wearing the wearable computing device 12 ("ref_img"). An image of one of the subjects 22 is recorded (408), and the wearable computing device 12 records biometric data of the subject 22 from one or more device sensors (410).

The imaging device 10 performs a facial recognition algorithm to determine coordinates of the subject 22A within the image (412). The wearable computing device 12 determines a user mood indication based on the biometric data (414), and provides a biometric response to the imaging device 10 that includes the device_ID and the mood indication (416). The imaging device 10 adds the device_ID, mood indication, and determined coordinates to the metadata of the recorded image (418). In one or more embodiments, these items are embedded along with existing metadata of the image (e.g., image timestamp, shutter speed, aperture, lens focal length, etc.).

The imaging device 10 uploads the image and its embedded metadata to media server 14 (420). The media server 14 links the image, the coordinates of the subject, and the mood indication to a user account associated with the device_ID (422). Thus, instead of relying on biometric data server 16 to store the recorded biometric data and make a mood indication, the mood indication is determined by the wearable computing device 12 and is embedded into the metadata of the recorded image.

As in the embodiment of FIG. 4, items shown in italics in FIG. 7 are optional, and may be excluded in some embodiments. Thus, in one or more embodiments the positioning determination 412 may be omitted, and inclusion of the reference image in 406 and of the coordinates in the linking of 422 may also be omitted.

Also, it is possible that actions shown as being performed sequentially in FIG. 7 may be performed concurrently or in different orders. For example, actions 410, 414 could happen after action 412.

The signaling shown in diagram 400 could be concurrently performed for multiple subjects 22A-B such that the metadata of the recorded image 30 includes a device ID for each device 12A-B, coordinates of each subject 22A-B, and a mood indicator for each subject 22A-B. Subsequently, the coordinates and biometric data for each respective subject 22A-B could be linked to respective a user account for that subject (e.g., a social media account).

As in the example of FIG. 4, the determining of the user mood indication could be based on a plurality of mood rules and/or a mapping of various moods to various items of biometric data. Also, the feature for accepting or rejecting photo responses received from wearable computing devices 12 could be included.

In one implementation of the signaling of FIG. 7, the wearable computing device does not perform action 414. Instead, raw sensor data is transmitted to the imaging device 10, and the determination of 414 is performed by the imaging device 10 or the media server 14.

Figure 8:
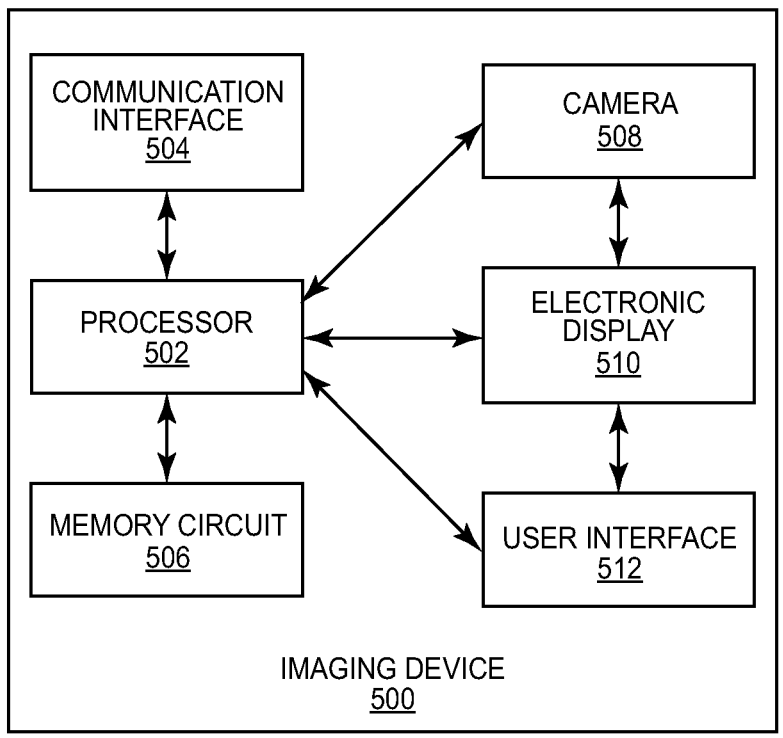
FIG. 8 is a block diagram of an example imaging device.

FIG. 8 is a block diagram of an example imaging device 500 that may be used as the imaging device 10 of FIG. 1. The imaging device 500 includes one or more processing circuits (shown as processor 502), including, for example, one or more microprocessors, microcontrollers, Application Specific Integrated Circuits (ASICs), or the like configured with appropriate software and/or firmware to carry out one or more of the techniques discussed above (e.g., those of FIGS. 4, 5, and 7). The imaging device 500 also includes a camera 508 which may include an imaging sensor circuit and a lens for recording images. The processor 502 is configured to use the camera 508 to record an image of a subject 22 to which a wearable computing device 600 is secured (see FIG. 9). The processor 502 is further configured to, responsive to the recording, wirelessly receive data from the wearable computing device 600, with the data including an identifier of the wearable computing device 600 and biometric data of the subject 22. The processor 502 is further configured to embed the identifier and the biometric data as metadata in the recorded image.

The imaging device 500 also includes a non-transitory computer-readable storage medium (shown as memory circuit 506) for storing the recorded images (e.g., image 30) and for storing instructions that configure the processor 502 as discussed above (e.g., a computer program product that configures the imaging device to implement one or more of the techniques described above). The imaging device 500 also includes a communication interface circuit 504, electronic display 510, and user interface 512.

The communication interface circuit 504 is configured to communicate using Bluetooth (e.g., Bluetooth version 4 and/or Bluetooth Low Energy "BLE"), one or more 802.11-based standards, one or more cellular communication standards (e.g., GSM, WCDMA, LTE, WiMax, etc.), or a combination thereof. The communication interface circuit 504 facilitates communication between the imaging device 500, the separate wearable computing device 600, and media server 700 (see FIG. 10). The electronic display 510 can be used, for example, to display recorded images and or to accept/reject biometric data from wearable computing devices. The user interface 512 may include one or more buttons, or may be integrated with the electronic display 510 to provide a touchscreen interface, for example.

Although the imaging device 10 shown in FIG. 1 is a mobile computing device 10 (e.g., a smartphone or tablet computer), it is understood that these are non-limiting examples, and that the imaging device 500 could instead be a laptop computer, digital camera, or video camera, for example.

In some embodiments, the imaging device 500 is operative to communicate directly with media server 14. However, in other embodiments an intermediate device may be used. For example, if the imaging device is a digital camera, photographs may be accumulated on a memory card, and may be uploaded to media server 700 via a laptop or desktop computer.

Figure 9:
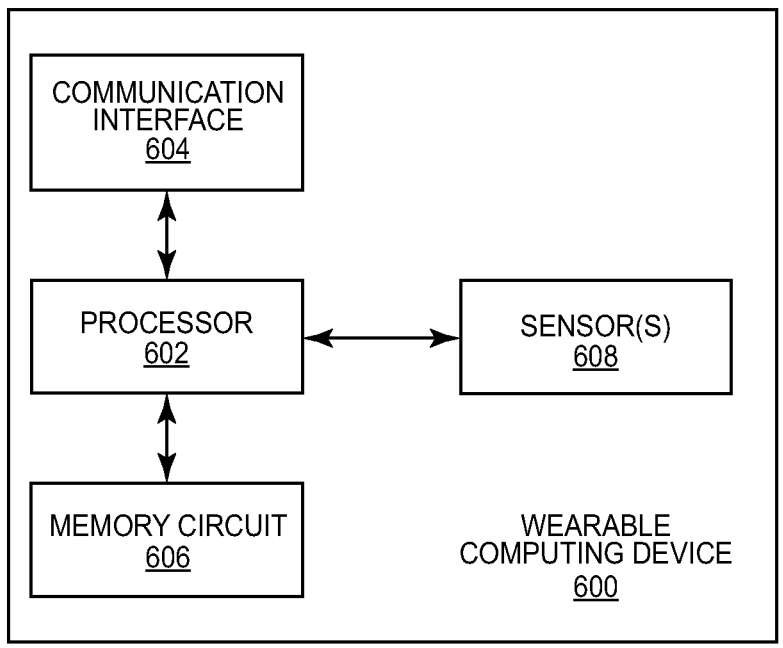
FIG. 9 is a block diagram of an example wearable computing device.

FIG. 9 is a block diagram of an example wearable computing device 600 that may be used as one or more of the wearable computing devices 12 of FIG. 1. The wearable computing device 600 includes one or more processing circuits (shown as processor 602), including, for example, one or more microprocessors, microcontrollers, Application Specific Integrated Circuits (ASICs), or the like configured with appropriate software and/or firmware to carry out one or more of the techniques discussed above. The wearable computing device 600 also includes a non-transitory computer-readable storage medium (shown as memory circuit 606) for storing recorded biometric data and/or mood indications derived from such biometric data.

The imaging device 600 also includes a communication interface circuit 604 configured to wirelessly communicate with the imaging device 500. The communication interface circuit may use Bluetooth (e.g., Bluetooth version 4 and/or Bluetooth Low Energy "BLE"), one or more 802.11-based standards, one or more cellular communication standards (e.g., GSM, WCDMA, LTE, WiMax, etc.), or a combination thereof, for example, to carry out communication with the imaging device 500.

Figure 11:
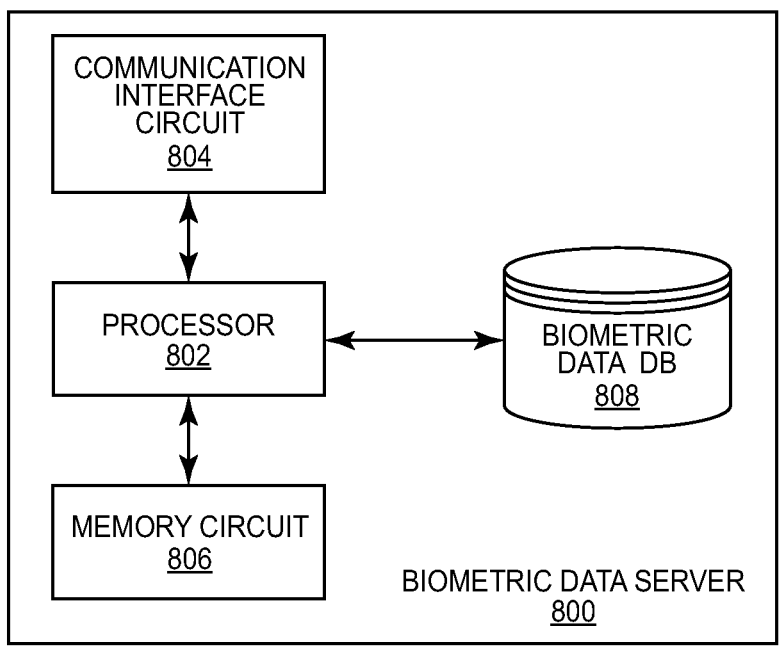
FIG. 11 is a block diagram of an example biometric data server.

In some embodiments, the wearable computing device 500 is operative to communicate with biometric data server 800 (see FIG. 11). In some embodiments, such communication may be performed directly between the wearable computing device 600 and biometric data server 600. In some embodiments, an intermediate device may be used. In one such embodiment, the wearable computing device 600 accumulates biometric data over a time period (e.g., minutes, hours, or days), and then periodically sends the accumulated biometric data to a computing device with a client application for upload to the biometric data server 800 using a device not shown in FIG. 1 (e.g., a laptop or smartphone of the subject 22 being photographed).

The wearable computing device 600 also includes one or more sensors 608 for recording biometric data. This may include one or more of a body temperature sensor, heart rate sensor, blood pressure sensor, sweat salinity sensor, etc. Of course, it is understood that these are only non-limiting examples, and that other types of sensors could be used.

Figure 10:
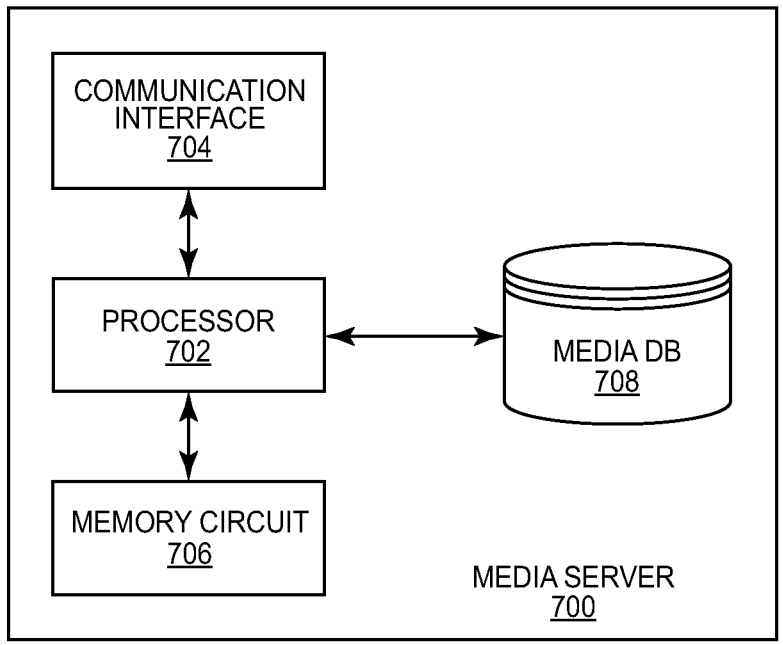
FIG. 10 is a block diagram of an example media server.

FIG. 10 is a block diagram of an example media server 700 that may be used as the media server 14 of FIG. 1. The media server 700 includes one or more processing circuits (shown as processor 702), including, for example, one or more microprocessors, microcontrollers, Application Specific Integrated Circuits (ASICs), or the like configured with appropriate software and/or firmware to carry out one or more of the techniques discussed above (e.g., those of FIGS. 4, 6, and 7). The media server 700 also includes a non-transitory computer-readable storage medium (shown as memory 706) that stores instructions that configure the processor 702 as discussed above (e.g., a computer program product that configures the processor media server 700 to implement one or more of the techniques described above).

The processor 702 is configured to obtain an image of a subject via a communication interface circuit 704, and determine a timestamp and device identifier from metadata embedded in the image. The processor 702 is further configured to send a request to a biometric data server 800 to obtain biometric data, the request including the timestamp and the device identifier. The processor 702 is further configured to, responsive to the sending, receive biometric data that comprises a mood indication for the subject. The processor 702 is further configured to link the image and the mood indication to a user account associated with the device identifier.

A media database 708 stores the images received from imaging device 500 (e.g., image 30) and biometric data associated with subjects in the images. In one or more embodiments, the media server 700 is used in connection with a social media website or application that enables sharing of the stored images amongst a plurality of users. In one or more embodiments, the user account to which the image and mood indication are linked is a social media user account, and the linking serves as a tag that tags the image with the user's account and with the mood indication.

The communication interface circuit 704 may use Bluetooth, one or more 802.11-based standards, one or more cellular communication standards (e.g., GSM, WCDMA, LTE, WiMax, etc.), or a combination thereof, for example to carry out communication with the imaging device 500 biometric data server 800.

FIG. 11 is a block diagram of an example biometric data server 800 that may be used as the biometric data server 16 of FIG. 1. The biometric data server 800 includes one or more processing circuits (shown as processor 802), including, for example, one or more microprocessors, microcontrollers, Application Specific Integrated Circuits (ASICs), or the like configured with appropriate software and/or firmware to carry out one or more of the techniques discussed above.

Thus, the processor 802 is configured to receive biometric data from the wearable computing device 600, and to store that data in biometric data database 808. The processor 802 is further configured to look up biometric data uploaded from the wearable computing device 12 based on a comparison of the biometric timestamp and image timestamp (see 122 in FIG. 4). In one or more embodiments, this involves matching the timestamps within a timestamp threshold (e.g., on the order of a number of seconds) to ensure that the biometric data being retrieved actually corresponds to the image in question.

The processor 802 is also configured to determine a user mood indication based on the stored biometric data for an image. As discussed above, the determining of the user mood indication could be based on a plurality of mood rules and/or a mapping of various moods to various items of biometric data. For example, various moods could be mapped to various combinations of biometric data, and/or various biometric data ranges. Some example moods could include happy, sad, excited, relaxed, anxious, stressed, content, etc. There may also be overlaps of mood. For example, a subject could be happy and excited at the same time, or could be happy and relaxed at the same time.

The biometric data server 800 also includes a non-transitory computer-readable storage medium (shown as memory circuit 806) that stores instructions that configure the processor 802 as discussed above (e.g., a computer program product that configures the processor 802 to implement one or more of the techniques described above). The biometric data server 800 also includes a communication interface circuit 804 configured to communicate with the wearable computing device 600 and media server 700. The communication interface circuit may use Bluetooth, one or more 802.11-based standards, one or more cellular communication standards (e.g., GSM, WCDMA, LTE, WiMax, etc.), or a combination thereof, for example.

Although the wearable computing device 12 has been illustrated as being worn around a user's wrist (a so-called "wristlet"), it is understood that this is only a non-limiting example, and that other types of wearable computing devices could be used (e.g., necklaces, rings, a head-mounted device such as glasses, a garment with built in sensors, etc.). Also, although human subjects have been shown, it is understood that mood could be determined for non-humans (e.g., pets or other animals).

The present disclosure may, of course, be carried out in other ways than those specifically set forth herein without departing from essential characteristics of the present disclosure. The present embodiments are to be considered in all respects as illustrative and not restrictive, and all changes coming within the meaning and equivalency range of the appended claims are intended to be embraced therein.

What is claimed is:

1. A method implemented by an imaging device, comprising:
   recording an image of a subject to which a wearable computing device is secured;
   responsive to the recording, wirelessly receiving data from the wearable computing device, the data including an identifier of the wearable computing device and biometric data of the subject; and embedding the identifier and the biometric data as metadata in the recorded image;

estimating a position of the subject within the recorded image by:
receiving a reference image of the subject's face from the wearable computing device; and
performing a facial recognition algorithm to determine the position of the subject within the recorded image based on the reference image; and embedding an indication of the position as metadata in the recorded image.

2. The method of claim 1, wherein recording the image comprises transmitting a request for biometric data to the wearable computing device.

3. The method of claim 1, wherein the biometric data includes an address of a biometric data server from which biometric data of the subject can be retrieved based on the device identifier.

4. The method of claim 1, wherein the biometric data includes one or more sensor readings recorded by the wearable computing device.

5. The method of claim 1, wherein the biometric data includes one or more mood indicators derived from sensor readings recorded by the wearable computing device.

6. A method implemented by a media server, comprising:
obtaining an image of a subject;
determining a timestamp and device identifier from metadata embedded in the image;
sending a request to a biometric data server to obtain biometric data, the request including the timestamp and the device identifier;
responsive to the sending, receiving biometric data that comprises a mood indication for the subject as depicted in the image; and
linking the image and the mood indication to a user account associated with the device identifier.

7. The method of claim 6, further comprising:
determining a location of the subject within the image from additional metadata embedded in the image;
wherein linking the image and the mood indication to a user account associated with the device identifier also includes linking the location of the subject within the image to the user account.

8. The method of claim 6, further comprising:
receiving a user request for images of the subject in which the subject is depicted in a specified mood;
based on the user request, determining a collection of images of the subject in which the subject is depicted in the specified mood; and
transmitting an indication of the collection of images as a response to the user request.

9. An imaging device, comprising:
a camera; and
one or more processing circuits configured to:
record an image of a subject to which a wearable computing device is secured, wherein the image is recorded using the camera;
responsive to the recording, wirelessly receive data from the wearable computing device, the data including an identifier of the wearable computing device and biometric data of the subject;
embed the identifier and the biometric data as metadata in the recorded image;
estimate a position of the subject within the recorded image by:
receiving a reference image of the subject's face from the wearable computing device; and
performing a facial recognition algorithm to determine the position of the subject within the recorded image based on the reference image; and
embed an indication of the position as metadata in the recorded image.

10. The imaging device of claim 9, wherein to record the image, the one or more processing circuits are configured to transmit a request for biometric data to the wearable computing device.

11. The imaging device of claim 9, wherein the biometric data includes an address of a biometric data server from which biometric data of the subject can be retrieved based on the device identifier.

12. The imaging device of claim 9, wherein the biometric data includes one or more sensor readings recorded by the wearable computing device.

13. The imaging device of claim 9, wherein the biometric data includes one or more mood indicators derived from sensor readings recorded by the wearable computing device.

14. A media server comprising:
a communication interface; and
one or more processing circuits configured to:
obtain an image of a subject via the communication interface;
determine a timestamp and device identifier from metadata embedded in the image;
send a request to a biometric data server to obtain biometric data, the request including the timestamp and the device identifier;
responsive to the sending, receive biometric data that comprises a mood indication for the subject as depicted in the image; and
link the image and the mood indication to a user account associated with the device identifier.

15. The media server of claim 14, wherein the one or more processing circuits are further configured to:
determine a location of the subject within the image from additional metadata embedded in the image; and
link the location of the subject within the image to the user account.

16. The media server of claim 14, wherein the one or more processing circuits are further configured to:
receive a user request for images of the subject in which the subject is depicted in a specified mood;
based on the user request, determine a collection of images of the subject in which the subject is depicted in the specified mood; and
transmit an indication of the collection of images as a response to the user request.

* * * * *